(Model.)

B. K. SHUMWAY.
CALIPERS AND DIVIDERS.

No. 263,602. Patented Aug. 29, 1882.

Witnesses.
Joseph Cutter
A. L. White

Inventor
B. K. Shumway
by Wright & Brown
Attys

UNITED STATES PATENT OFFICE.

BERNARD K. SHUMWAY, OF CHICOPEE FALLS, MASSACHUSETTS.

CALIPERS AND DIVIDERS.

SPECIFICATION forming part of Letters Patent No. 263,602, dated August 29, 1882.

Application filed February 17, 1882. (Model.)

*To all whom it may concern:*

Be it known that I, BERNARD K. SHUMWAY, of Chicopee Falls, in the county of Hampden and State of Massachusetts, have invented certain Improvements in Calipers and Dividers, of which the following is a specification.

This invention relates to calipers and dividers in which a screw-shaft is journaled in the head to which the legs of the instrument are pivoted, and is provided with a nut which is caused by the rotation of the shaft to move longitudinally of the latter, the nut being so connected with the legs that its movements will cause the adjustment of the legs.

The invention has for its object, first, to provide improved means for connecting the nut to the legs in an instrument of this class; and, secondly, to so arrange the head or thumb-piece, whereby the screw is rotated, that the operator can hold the instrument and rotate the screw with the same hand more conveniently than heretofore.

To these ends my invention consists in the improvements which I will now proceed to describe and claim.

Figure 1:
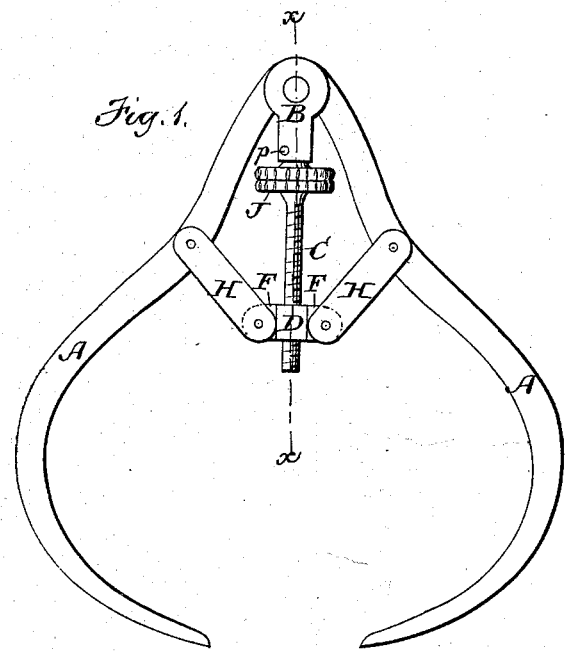
Figure 2:
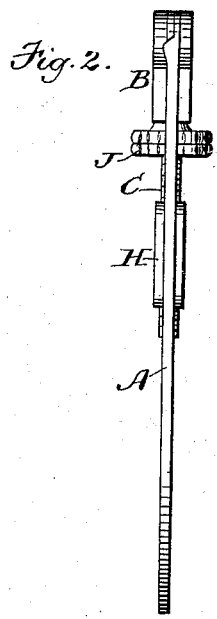
Figure 3:
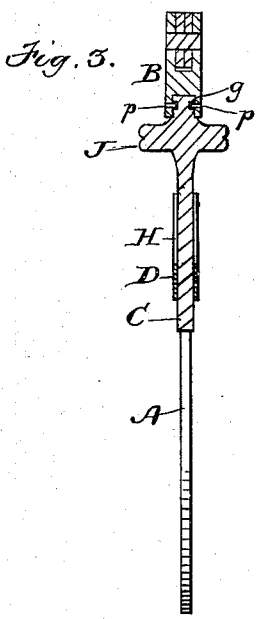

Of the accompanying drawings, forming a part of this specification, Figure 1 represents a side view of a pair of calipers embodying my invention. Fig. 2 represents an edge view of the same. Fig. 3 represents a section on line *x x* of Fig. 1.

The same letters of reference indicate the same parts in all the figures.

In the drawings, A A represent the legs of a pair of calipers; B, the head to which the legs are pivoted; C, the screw-shaft, which is journaled in the head B, so as to rotate freely without moving longitudinally therein, and D the nut through which the threaded portion of the screw passes.

The head B may be of any suitable form, and the screw-shaft may be journaled to the head in any suitable manner. In the present instance I have shown the head constructed in the form of a yoke having two arms projecting upwardly from a block. The inner ends of the legs are placed between said arms, (which form washers,) and are connected thereto by a suitable rivet or pivot passing through orifices in the arms of the yoke and in the legs. The block of the yoke has an orifice, in which the upper end of the screw-shaft C is journaled, said shaft having a groove, *g*, in its upper end, into which project one or more pins, *p*, which are inserted in the block, as shown in Fig. 3, so that it cannot move longitudinally with reference to the yoke.

The nut D is provided with lateral ears F F, which are connected with the legs A A by rigid links H H, pivoted both to the ears of the nut and to the legs. These links, which constitute the principal feature of my invention, establish a connection between the nut and the legs, whereby, first, the nut is prevented from turning with the screw-shaft, and is thus caused to travel on said shaft when the latter is rotated; secondly, the legs are positively moved in each direction by the traveling motions of the nut, and positively held at any desired point of adjustment when the nut is at rest; and, thirdly, the legs are made less liable to spring at their points than if the links were not employed. Heretofore in an instrument of this class the nut has been provided with springs, which press the legs outwardly and against stops which are moved by the nut; but I am not aware that a positive connection similar to mine has ever been employed.

J represents a milled head or thumb-piece, which is rigidly attached to the screw C to enable the operator to rotate the screw. Heretofore the milled head J has been placed outside of the space between the legs of the instrument, the shaft being extended through the head to which the legs are pivoted. I locate the head J between the legs A A, as shown in Fig. 1, so that said head is more conveniently operated by the thumb and finger of the hand that holds the instrument than it would be if located above the legs, as will be readily seen.

I am aware that calipers have been made with the legs jointed to a cross-bar, through which a screw slides, carrying a nut above the bar and connected by links to the legs of the caliper below; but this necessitates the spreading of the legs far apart at the head of the implement, while the projecting end of the screw is liable to get bent, and thereby render the instrument inoperative. The nut is also liable to become detached and lost, or it must be connected by a swivel-connection to the bar, which is expensive. I obviate these objections by jointing the upper ends of the legs and the screw by one pivot, securing a thumb-wheel directly to the screw and the nut to the links, thus confining all the parts within the space inclosed by the legs, avoiding all projections and loose parts, and cheapening the manufacture.

I claim—

The combination, in calipers, of legs connected by a pivot, a screw connected at the pivotal point to the legs and extending between the legs, a thumb-wheel thereon between the legs, links H H, pivoted to the legs, and a nut receiving the screw and pivoted to the links, as specified.

In testimony whereof I have signed my name to this specification in the presence of two subscribing witnesses.

BERNARD K. SHUMWAY.

Witnesses:
SHERMAN R. NYE,
HENRY F. HEATH.